United States Patent
Lee et al.

(10) Patent No.: US 9,519,125 B2
(45) Date of Patent: Dec. 13, 2016

(54) ZOOM LENS AND PHOTOGRAPHING APPARATUS HAVING THE SAME

(71) Applicant: SAMSUNG ELECTRONICS CO., LTD., Suwon-si, Gyeonggi-do (KR)

(72) Inventors: Hwan-seon Lee, Suwon-si (KR); Jung-hyun Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 196 days.

(21) Appl. No.: 14/043,152

(22) Filed: Oct. 1, 2013

(65) Prior Publication Data
US 2014/0185146 A1 Jul. 3, 2014

(30) Foreign Application Priority Data
Dec. 28, 2012 (KR) .................. 10-2012-0157332

(51) Int. Cl.
*G02B 15/16* (2006.01)
*G02B 15/173* (2006.01)

(52) U.S. Cl.
CPC ............ *G02B 15/16* (2013.01); *G02B 15/173* (2013.01)

(58) Field of Classification Search
CPC ....... G02B 13/00; G02B 13/001; G02B 15/10; G02B 13/009; G02B 13/0045; G02B 15/163; G02B 15/28; G02B 15/10; G02B 15/16
USPC ........ 359/687, 686, 676, 713, 714, 734, 735
See application file for complete search history.

(56) References Cited

U.S. PATENT DOCUMENTS

| | | | |
|---|---|---|---|
| 6,388,818 B1 | 5/2002 | Tochigi | |
| 7,221,518 B2 | 5/2007 | Kim et al. | |
| 7,319,562 B2 | 1/2008 | Itoh | |
| 7,679,837 B2* | 3/2010 | Souma | 359/690 |
| 7,760,441 B2 | 7/2010 | Ono et al. | |
| 7,830,612 B2 | 11/2010 | Hagiwara | |
| 7,885,013 B2 | 2/2011 | Satori | |
| 8,085,480 B2 | 12/2011 | Iwasawa et al. | |
| 8,107,171 B2 | 1/2012 | Nanba | |
| 8,159,757 B2 | 4/2012 | Li | |
| 8,159,758 B2 | 4/2012 | Itoh | |
| 8,325,425 B2 | 12/2012 | Yoshitsugu | |
| 2008/0158693 A1* | 7/2008 | Kang et al. | 359/708 |
| 2009/0219619 A1* | 9/2009 | Mitsuki | 359/557 |
| 2010/0296173 A1* | 11/2010 | Kanazashi | 359/687 |
| 2011/0222169 A1* | 9/2011 | Sudoh | 359/687 |
| 2011/0228408 A1* | 9/2011 | Sudoh | 359/687 |
| 2012/0307377 A1* | 12/2012 | Horiuchi | G02B 15/173 359/687 |

FOREIGN PATENT DOCUMENTS

EP 2500760 A2 * 9/2012

* cited by examiner

*Primary Examiner* — Darryl J Collins
*Assistant Examiner* — Journey Sumlar
(74) *Attorney, Agent, or Firm* — Drinker Biddle & Reath LLP

(57) ABSTRACT

A zoom lens and a photographing apparatus including the zoom lens are provided. The zoom lens includes a first lens group having a positive refractive power, a second lens group having a negative refractive power, a third lens group having a positive refractive power, and a fourth lens group having a positive refractive power, all of which are arranged sequentially from an object side to an image side. The second lens group may include a first negative lens, a second negative lens, and a first positive lens. The second lens group may also satisfy $5.6 \leq |fG2_{n2}/fw| \leq 10.0$, where $fG2_{n2}$ is a focal length of the second negative lens therein and fw is an overall focal length of the zoom lens at a wide-angle position.

14 Claims, 13 Drawing Sheets

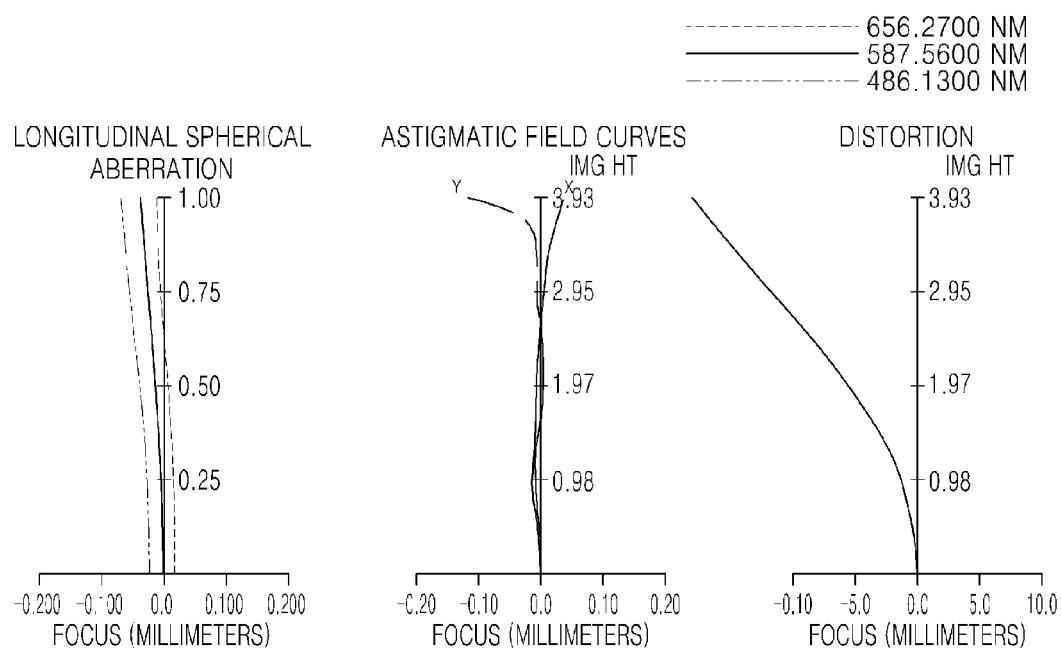
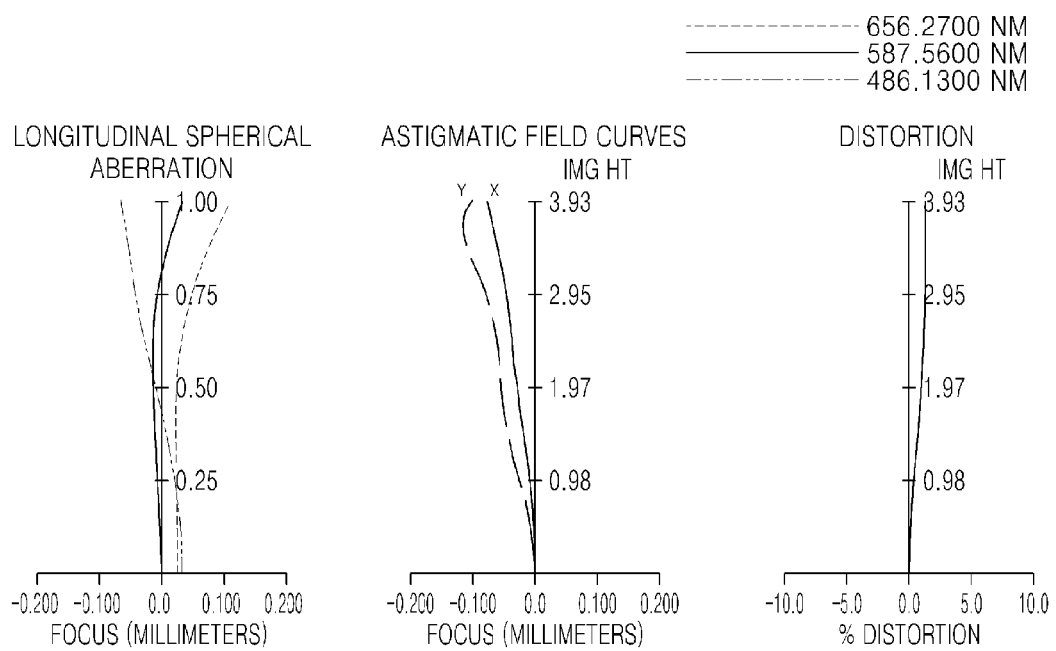

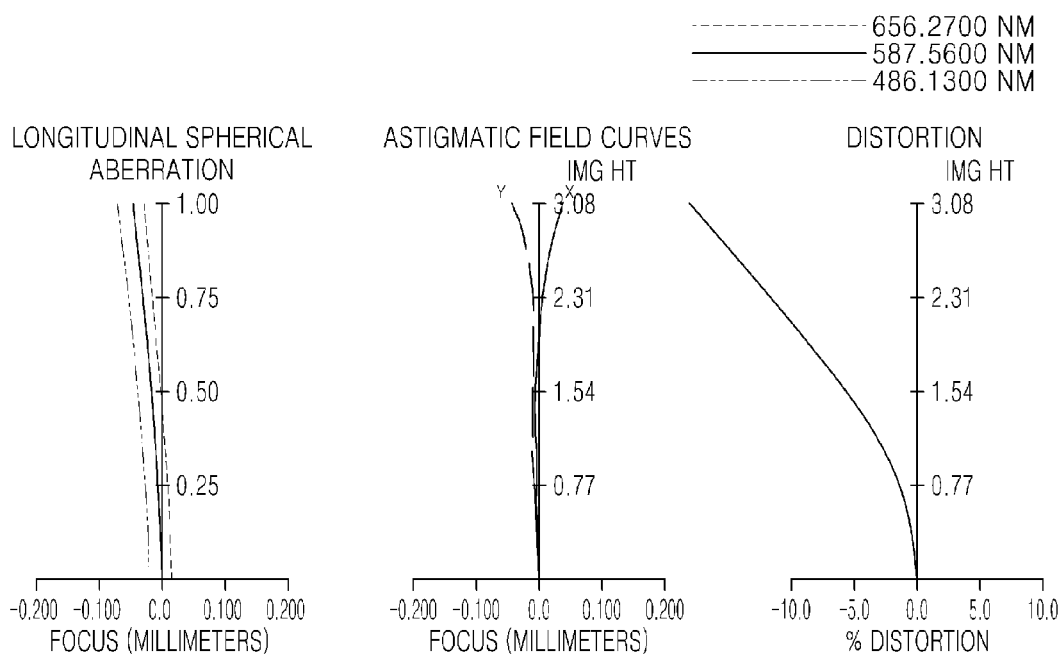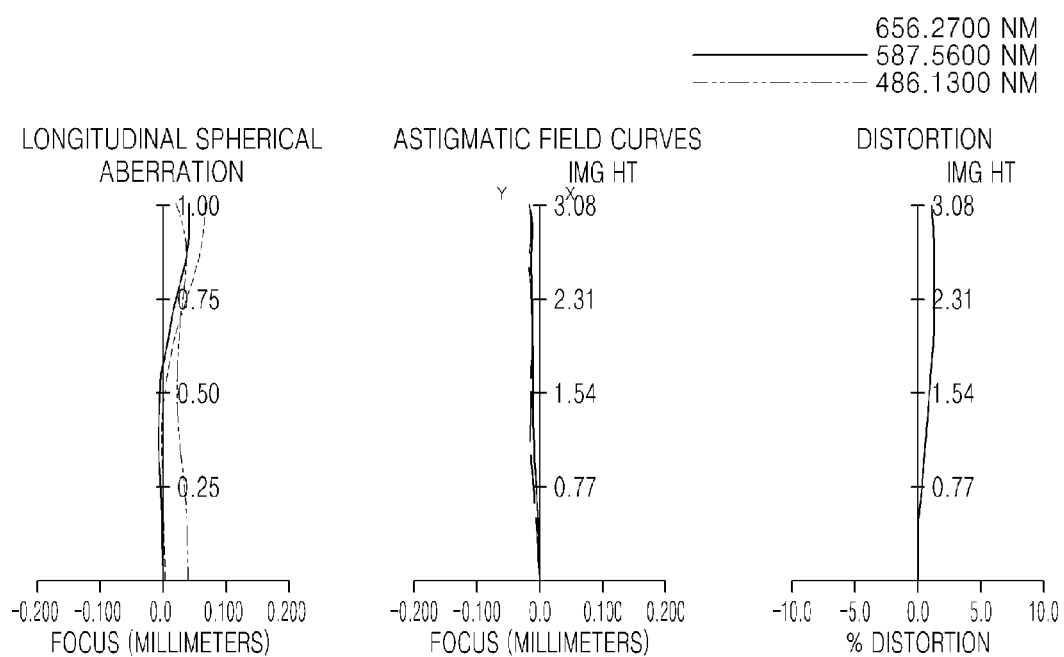

ZOOM LENS AND PHOTOGRAPHING APPARATUS HAVING THE SAME

CROSS-REFERENCE TO RELATED PATENT APPLICATION

This application claims the priority benefit of Korean Patent Application No. 10-2012-0157332, filed on Dec. 28, 2012, in the Korean Intellectual Property Office, the disclosure of which is incorporated herein in its entirety by reference.

BACKGROUND

1. Field

Various embodiments of the invention relate to an inexpensive zoom lens with a high zoom ratio and a photographing apparatus having the same.

2. Related Art

In photographing apparatuses using solid-state imaging devices, such as digital cameras, interchangeable lens systems or video cameras, users require the devices to have high resolution and high magnification. Furthermore, nowadays, consumers have more expertise in photographing apparatuses, and a video camera or digital camcorder employing a solid-state imaging device such as a charge-coupled device (CCD) or complementary metal-oxide-semiconductor (CMOS) imaging device are being developed to meet the increasing demand for an optical system with a compact, high magnification zoom lens.

In order to provide a compact zoom lens with a high zoom ratio, a refractive power of each lens group needs to be increased while minimizing the number of lenses in the lens group. However, the zoom lens having the above-described configuration readily suffers from aberration variations upon zooming, and it may be difficult to obtain a high optical performance over the entire zoom range. To create a compact zoom lens with a high zoom ratio, a plurality of glass aspherical lenses may be used, or a lens material with a high refractive index may be developed. However, the use of a plurality of glass aspherical lenses may increase manufacturing costs, thereby making it difficult to achieve an inexpensive zoom lens.

SUMMARY

Various embodiments of the invention provide an inexpensive zoom lens with a high zoom ratio.

Various embodiments of the invention also provide a photographing apparatus including the inexpensive zoom lens with a high zoom ratio.

According to an embodiment, a zoom lens includes a first lens group having a positive refractive power, a second lens group having a negative refractive power, a third lens group having a positive refractive power, and a fourth lens group having a positive refractive power, all of which are arranged sequentially from an object side to an image side. The second lens group includes a first negative lens, a second negative lens, and a first positive lens, and satisfies $5.6 \leq |fG2_{n2}/fw| \leq 10.0$, where $fG2_{n2}$ is a focal length of the second negative lens therein, and fw is an overall focal length of the zoom lens at a wide-angle position.

The second negative lens in the second lens group may be made of plastic.

The zoom lens may further satisfy $1.5 \leq |fG2\_n2|/\sqrt{(fw*ft)} \leq 3.0$, where ft is an overall focal length of the zoom lens at a telephoto position.

The zoom lens may further satisfy $0.65 < |fG2n/fG2| < 0.85$, where fG2n is an effective focal length of the first and second negative lenses in the second lens group, and fG2 is the overall focal length of the second lens group.

Upon zooming from the wide-angle position to the telephoto position, distances between the first and second lens groups and between the third and fourth lens groups may increase, while a distance between the second and third lens groups may decrease.

The first lens group may include a third negative lens and a second positive lens.

The third negative lens in the first lens group may have a meniscus shape that is convex toward the object side.

The third negative lens and the second positive lens in the first lens group may be cemented together to form a doublet lens.

The third lens group may include a third positive lens and a fourth positive lens, each of the third and fourth positive lenses having a double-convex shape, and a fourth negative lens.

The fourth positive lens and the fourth negative lens in the third lens group may be cemented together to form a doublet lens.

At least one of the third and fourth positive lenses may have at least one aspherical surface.

The fourth lens group may include one fifth positive lens.

The fifth positive lens may be made of plastic.

The fourth lens group may perform focusing.

The second negative lens in the second lens group may have a meniscus shape that is convex toward the object side.

According to another embodiment, a photographing apparatus includes a zoom lens and an imaging device for receiving an image formed by the zoom lens. The zoom lens includes a first lens group having a positive refractive power, a second lens group having a negative refractive power, a third lens group having a positive refractive power, and a fourth lens group having a positive refractive power, all of which are arranged sequentially from an object side to an image side. The second lens group includes a first negative lens, a second negative lens, and a first positive lens, and satisfies $5.6 \leq |fG2_{n2}/fw| \leq 10.0$, where $fG2_{n2}$ is a focal length of the second negative lens therein and fw is an overall focal length of the zoom lens at a wide-angle position.

BRIEF DESCRIPTION OF THE DRAWINGS

The above and other features and advantages of the various embodiments of the invention will become more apparent by describing in detail exemplary embodiments thereof with reference to the attached drawings in which:

FIG. 8 is a diagram illustrating aberrations of the zoom lens of FIG. 7 at the wide-angle position;

FIG. 9 is a diagram illustrating aberrations of the zoom lens of FIG. 7 at the telephoto position;

FIG. 11 is a diagram illustrating aberrations of the zoom lens of FIG. 10 at the wide-angle position;

FIG. 12 is a diagram illustrating aberrations of the zoom lens of FIG. 10 at the telephoto position;

DETAILED DESCRIPTION

Figure 1:
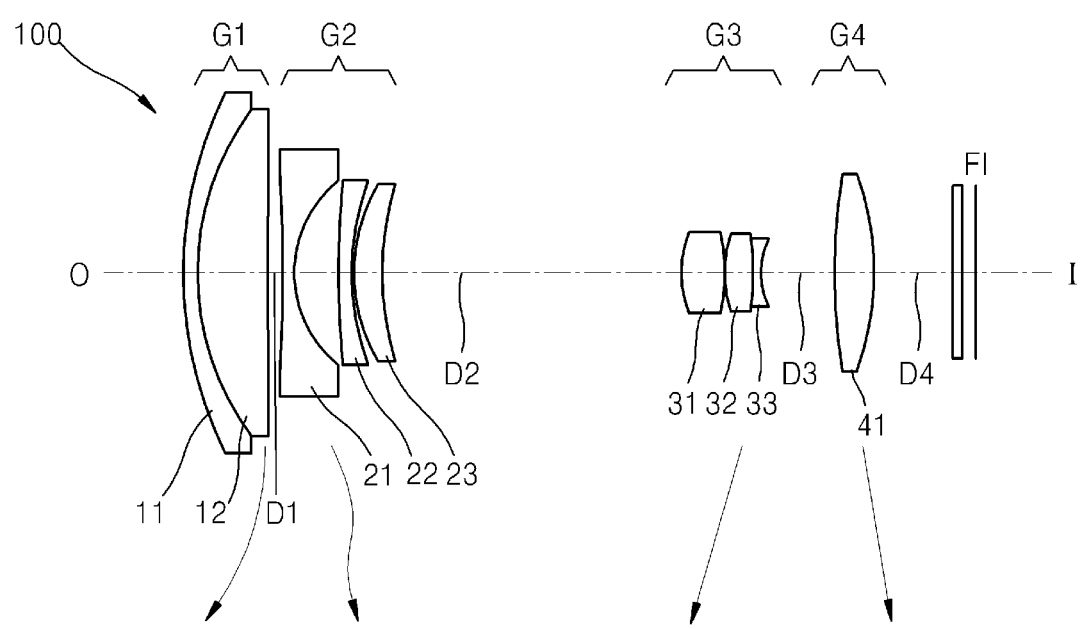
FIG. 1 is a diagram illustrating a zoom lens, according to an embodiment.

Reference will now be made in detail to embodiments of a zoom lens and a photographing apparatus having the same, examples of which are illustrated in the accompanying drawings, wherein like reference numerals refer to like elements throughout. Expressions such as "at least one of," when preceding a list of elements, modify the entire list of elements and do not modify the individual elements of the list.

FIG. 1 illustrates a zoom lens 100, according to an embodiment. Referring to FIG. 1, the zoom lens 100 includes a first lens group G1 having a positive refractive power, a second lens group G2 having a negative refractive power, a third lens group G3 having a positive refractive power, and a fourth lens group G4 having a positive refractive power, all of which are arranged sequentially from an object side O toward an image side I.

Upon zooming from a wide-angle position to a telephoto position, distances between the first and second lens groups G1 and G2 (D1) and between the third and fourth lens groups G3 and G4 (D3) increase, while a distance between the second and third lens groups G2 and G3 (D2) decreases. The fourth lens group G4 may perform focusing.

The first lens groups G1 includes a first negative lens 11 and a second positive lens 12. The first negative lens 11 may have a meniscus shape which is convex toward the object side O. The first negative lens 11 and the second positive lens 12 may be cemented together to form a doublet lens. The first negative lens 11 may be formed of a material with a high refractive index.

The second lens group G2 may include one or more negative lenses and one positive lens. For example, the second lens group G2 may include third and fourth negative lenses 21 and 22 and a fifth positive lens 23. At least one of the third and fourth negative lenses 21 and 22 may be made of plastic and may have one or more aspherical surfaces so as to achieve a high zoom ratio and a wide angle. The third and fourth negative lenses 21 and 22 may correct comatic aberrations and astigmatism induced due to incoming off-axis light rays.

The third lens group G3 includes a sixth positive lens 31, a seventh positive lens 32, and an eighth negative lens 33.

The sixth and seventh positive lenses 31 and 32 are double-convex (biconvex) lenses. The seventh positive lens 32 and the eighth negative lens 33 may be attached together to form a doublet lens and have a positive refractive power. At least one of the sixth and seventh positive lenses 31 and 32 may have one or more aspherical surfaces so as to effectively compensate for aberrations during zooming.

The fourth lens group G4 includes one ninth positive lens 41 which is made of plastic.

Each of the second and fourth lens groups G2 and G4 may include at least one plastic lens and use one or more aspherical surfaces to thereby reduce manufacturing costs. Furthermore, a plastic aspherical lens permits more flexibility in selecting a shape of an aspherical surface than a glass aspherical lens.

The second lens group G2 may have a long focal length. When the third or fourth negative lens 21 or 22 in the second lens group G2 is made of plastic, the second lens group G2 may undergo large focal length variations due to a temperature change since a plastic lens is more vulnerable to the temperature change than a glass lens. In order to compensate for variations in a focal position due to a temperature change, the refractive power of the second lens group G1 may be decreased, thereby increasing the focal length thereof.

The zoom lens 100 according to the embodiment satisfies the following inequality:

$$5.6 \leq |fG2_{n2}/fw| \leq 10 \tag{1}$$

where $fG2_{n2}$ is a focal length of the fourth negative lens 22 in the second lens group G2 and fw is the overall focal length of the zoom lens 100 at the wide-angle position.

Inequality (1) represents a ratio of the focal length of the fourth negative lens 22 in the second lens group G2 to the focal length of the zoom lens 100 at the wide-angle position and restricts a refractive power of the fourth negative lens 22. When the zoom lens 100 satisfies inequality (1), it is possible to correct spherical aberrations and comatic aberrations from the wide-angle position to the telephoto position. If the fourth negative lens 22 in the second lens group G2 is a plastic aspherical lens and has a focal length that satisfies inequality (1), a variation in a focal point in an image plane due to a temperature change may be reduced.

When $|fG2_{n2}/fw|$ exceeds the upper limit of inequality (1), a radius of curvature of a par-axis of the fourth negative lens increases, which decreases its refractive power. However, since a refractive power of an aspherical surface of the fourth negative lens 22 increases, it may be advantageous for correcting spherical aberrations, comatic aberrations and astigmatism, but increase a lens sensitivity. Conversely, when $|fG2_{n2}/fw|$ falls below the lower limit of inequality (1), the fourth negative lens 22 has a shorter focal length and thus a strong refractive power, and is likely to deform into a double-concave shape. The increase in the refractive index of the fourth negative lens 22 may easily move the focal point position due to a temperature change. This requires sufficient space for focusing at the telephoto position and increases the total optical length of the zoom lens. Thus, it may be difficult to achieve a compact zoom lens.

The zoom lens 100 according to the embodiment may also satisfy the following inequality:

$$1.5 \leq |fG2_{n2}|/\sqrt{(fw*ft)} \leq 3.0 \tag{2}$$

where ft denotes the overall focal length of the zoom lens 100 at the telephoto position.

Inequality (2) represents a ratio of the focal length of the fourth negative lens 22 in the second lens group G2 to the square root of the product of effective focal lengths of the zoom lens 100 at the wide-angle position and at the telephoto position. When $|fG2_{n2}|/\sqrt{(fw*ft)}$ exceeds the upper limit of inequality (2), the refractive power of the fourth negative lens 22 decreases so it is difficult to correct comatic aberrations and astigmatic field curves. A refractive power of the third negative lens 21 increases to cause a large astigmatism. Conversely, when $|fG2_{n2}|/\sqrt{(fw*ft)}$ falls below the lower limit of inequality (2), the refractive power of the third negative lens 21 decreases while those of the fourth negative lens 22 and the fifth positive lens 23 increase. In order to correct astigmatism and distortion at the wide-angle position, which occur in the third negative lens 21, the refractive power of the aspherical surface of the fourth negative lens 22 increases, and spherical aberration at the telephoto position increases.

The zoom lens 100 according to the embodiment may also satisfy the following inequality:

$$0.65 < |fG2n/fG2| < 0.85 \qquad (3)$$

where fG2n is an effective focal length of the third negative lens 21 and fourth negative lens 22 in the second lens group G2, and fG2 is the overall focal length of the second lens group G2.

Inequality (3) represents a ratio of the overall effective focal length of the third and fourth negative lenses 21 and 22 in the second lens group G2 to the overall effective focal length of the second lens group G2. When ⊕fG2n/fG2| exceeds the upper limit of inequality (3), a refractive power of the third and fourth negative lenses 21 and 22 in the second lens group G2 decreases. Thus, in order to correct spherical aberrations, comatic aberrations, and lateral chromatic aberrations, a distance between the third and fourth negative lenses 21 and 22 increases so that the second lens group G2 becomes thick. Since the thickness of a lens is a factor in determining a thickness of a retractable lens barrel (i.e., space within the retractable lens barrel to accommodate the lenses), it may be difficult to achieve compactness. On the other hand, when |fG2n/fG2| falls below the lower limit of inequality (3), the thickness of the second lens group G2 may be decreased. However, since a refractive power of the third and fourth negative lenses 21 and 22 increases due to a decrease in the overall effective focal length thereof, the sensitivity of the second lens group G2 may be easily increased.

For example, if at least one of the third and fourth negative lenses 21 and 22 is made of plastic, the amount of movement of a focal point in an image plane may increase due to a temperature change. Thus, during focusing by the fourth lens group G4, it is necessary to obtain a maximum distance between the fourth lens group G4 and the image plane. This may increase the total length of the zoom lens 100 at the telephoto position, thereby imposing a limitation on reducing the size of the zoom lens 100.

As described above, the zoom lens 100 according to the embodiment is inexpensive and may have a high zoom ratio. For example, the zoom lens 100 may have a zoom ratio of about 7 to about 12. Furthermore, the zoom lens 100 includes one or more plastic lenses to thereby reduce manufacturing costs, and is designed to correct aberrations by adjusting a focal length of the one or more plastic lens, thereby providing a high optical performance.

An aspherical surface used in the zoom lens 100 according to the embodiment can be defined as follows: When an X-axis is an optical axis direction, and a Y-axis is a direction perpendicular to the optical axis direction, an aspherical shape may be represented by Equation (4) below, and a propagation direction of rays may be regarded as being positive. In Equation (4), x is a distance along an optical axis direction from an apex of a lens, y is a distance in the direction perpendicular to the optical axis direction, K is a conic constant, A, B, C, and D are aspherical coefficients, and c is the reciprocal of the radius of curvature (1/R) at the apex of the lens.

$$x = \frac{cy^2}{1 + \sqrt{1 - (K+1)c^2 y^2}} + Ay^4 + By^6 + Cy^8 + Dy^{10} \qquad (4)$$

Design data for zoom lenses according to one or more embodiments of the invention will now be described. Hereinafter, f denotes a total focal length in mm, Fno is an F-number, OAL is an overall length of a zoom lens, 2 ω is the field of view (FOV) in degrees, and BFL is a back focal length. R is a radius of curvature, Dn is a distance between lenses or a thickness of a lens, Nd is refractive index of a material, Vd is an Abbe number of the material, and the mark (*) denotes an aspherical surface. In the drawings illustrating respective embodiments, at least one filter F1 may be arranged at a side that is the closest to an image side I.

Embodiment 1

Table 1 shows design data of the zoom lens 100 of FIG. 1. Although reference numerals S1 through Sn of lens surfaces (n is a natural number) are indicated sequentially from a first surface of a lens that is closest to the object side O in FIG. 1, the reference numerals S1 through Sn are omitted in the drawings.

TABLE 1

| Lens surface | Radius of curvature (R) | Thickness (Dn) | Nd | Vd |
| --- | --- | --- | --- | --- |
| S1 | 18.289 | 0.68 | 2.0010 | 29.13 |
| S2 | 12.150 | 3.18 | 1.6968 | 55.46 |
| S3 | 254.678 | D1 | | |
| S4 | −92.347 | 0.50 | 1.8061 | 40.73 |
| S5 | 5.448 | 2.01 | | |
| S6* | 29.828 | 0.55 | 1.5312 | 56.51 |
| S7* | 9.247 | 0.10 | | |
| S8 | 7.942 | 1.19 | 2.1021 | 16.77 |
| S9 | 12.469 | D2 | | |
| S10* | 5.075 | 1.89 | 1.5892 | 60.62 |
| S11* | −12.956 | 0.14 | | |
| S12 | 6.494 | 1.19 | 1.8061 | 33.27 |
| S13 | −19.860 | 0.36 | 1.8052 | 25.46 |
| S14 | 3.422 | D3 | | |
| S15* | 30.682 | 1.80 | 1.5312 | 56.51 |
| S16* | −13.818 | D4 | | |
| S17 | ∞ | 0.50 | 1.5168 | 64.20 |
| S18 | ∞ | 0.59 | | |
| S19 | ∞ | | | |

Table 2 below shows aspherical coefficients in the zoom lens 100 of FIG. 1.

TABLE 2

| Lens surface | K | A | B | C | D |
|---|---|---|---|---|---|
| S6 | 38.00000 | −1.60201E−03 | 8.17344E−05 | −1.87364E−06 | 1.66404E−08 |
| S7 | 0.17418 | −1.78998E−03 | 1.06998E−04 | −3.12882E−05 | 4.05015E−08 |
| S10 | −1.11981 | −7.39083E−05 | 0.00000E+00 | 0.00000E+00 | 0.00000E+00 |
| S11 | −2.27722 | 2.55157E−04 | 3.98185E−07 | 2.02987E−06 | −6.36162E−07 |
| S15 | 1.00000 | 1.10759E−03 | −1.22767E−04 | 5.97778E−06 | −1.27610E−07 |
| S16 | −2.63478 | 1.54766E−03 | −1.70393E−04 | 7.37445E−06 | −1.39654E−07 |

Table 3 shows variable distances in the zoom lens 100 of FIG. 1 during zooming.

TABLE 3

| | Wide-angle position | Middle position | Telephoto position |
|---|---|---|---|
| D1 | 0.72 | 6.36 | 17.51 |
| D2 | 13.69 | 4.95 | 0.50 |
| D3 | 3.47 | 10.92 | 15.78 |
| D4 | 3.41 | 3.13 | 2.03 |

Table 4 shows various design data of the zoom lens 100 of FIG. 1 at a wide-angle position, a middle position, and a telephoto position.

TABLE 4

| | Wide-angle position | Middle position | Telephoto position |
|---|---|---|---|
| F | 4.45 | 13.52 | 41.90 |
| FNo | 3.20 | 5.16 | 6.48 |
| OAL | 35.98 | 40.07 | 50.50 |
| 2w | 41.59 | 16.29 | 5.39 |
| BFL (in air) | 4.32 | 4.07 | 2.95 |

Figure 2:
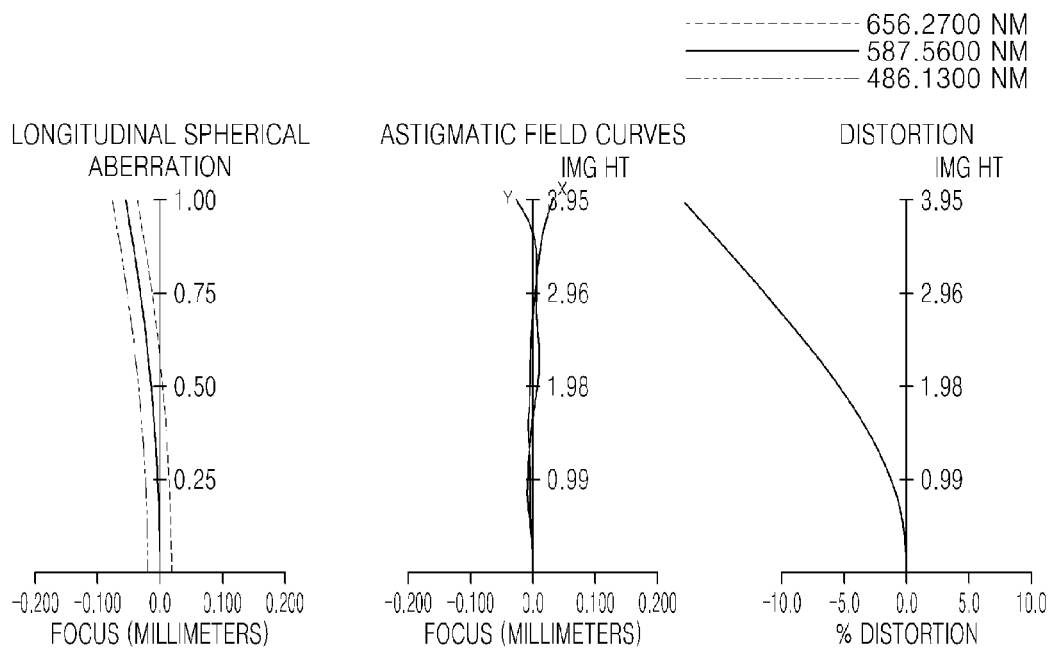
FIG. 2 is a diagram illustrating aberrations of the zoom lens of FIG. 1 at the wide-angle position.
Figure 3:
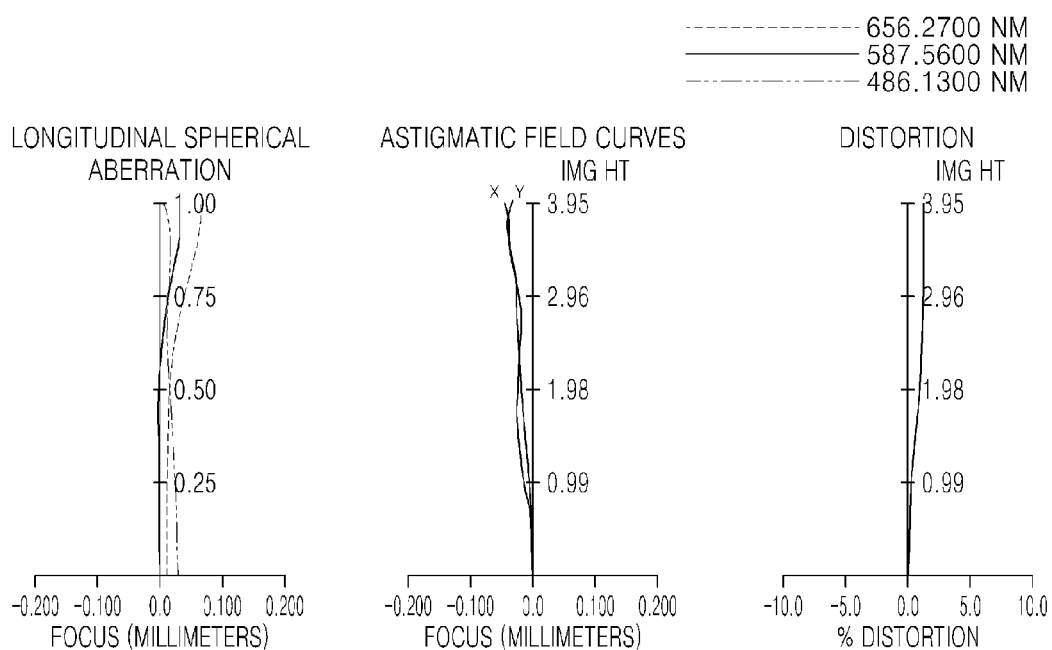
FIG. 3 is a diagram illustrating aberrations of the zoom lens of FIG. 1 at the telephoto position.

FIGS. 2 and 3 illustrate longitudinal spherical aberration, astigmatic field curves, and distortion of the zoom lens 100 of FIG. 1 at the wide-angle position and at the telephoto position, respectively. In the astigmatic field curves, X and Y denote sagittal field curvature and tangential field curvature, respectively.

Embodiment 2

Figure 4:
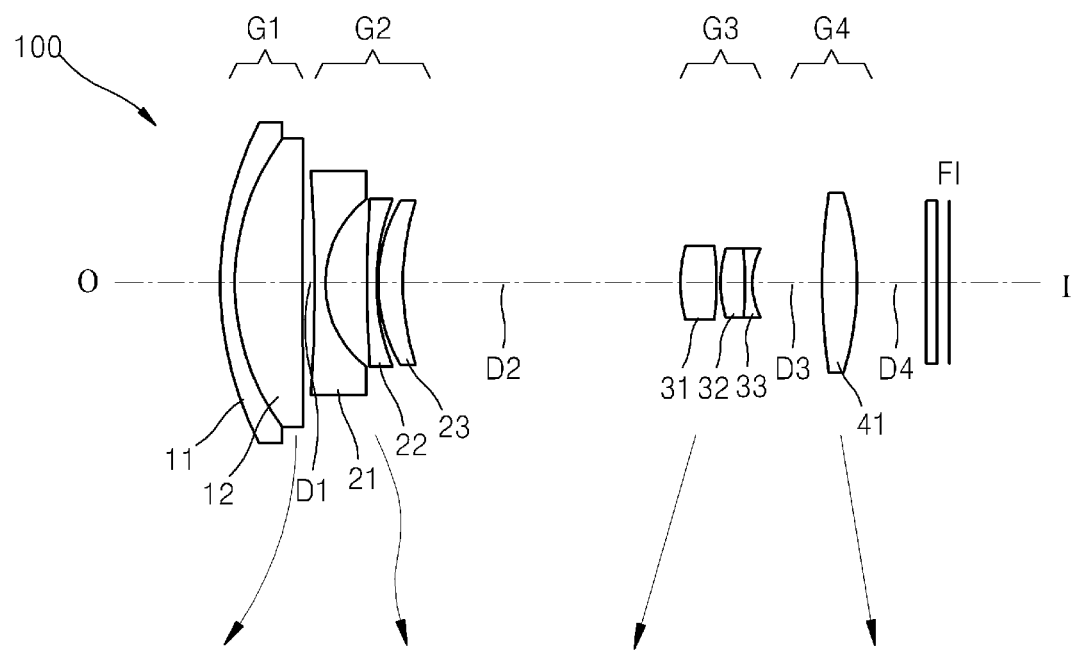
FIG. 4 is a diagram illustrating a zoom lens, according to another embodiment.

FIG. 4 illustrates a zoom lens 100 according to another embodiment, and Table 5 below shows design data of the zoom lens 100 of FIG. 4.

TABLE 5

| Lens surface | Radius of curvature (R) | Thickness (Dn) | Nd | Vd |
|---|---|---|---|---|
| S1 | 18.254 | 0.68 | 2.0010 | 29.13 |
| S2 | 12.097 | 3.28 | 1.6968 | 55.46 |
| S3 | 281.268 | D1 | | |
| S4 | −89.788 | 0.50 | 1.8061 | 40.73 |
| S5 | 5.420 | 1.98 | | |
| S6* | 21.710 | 0.70 | 1.5312 | 56.51 |
| S7* | 8.348 | 0.10 | | |
| S8 | 7.784 | 1.25 | 2.1042 | 17.02 |
| S9 | 11.939 | D2 | | |
| S10* | 5.096 | 2.00 | 1.5892 | 60.62 |
| S11* | −13.511 | 0.14 | | |
| S12 | 6.605 | 1.20 | 1.8061 | 33.27 |
| S13 | −20.703 | 0.36 | 1.8052 | 25.46 |
| S14 | 3.500 | D3 | | |
| S15* | 33.894 | 1.70 | 1.5312 | 56.51 |
| S16* | −13.774 | D4 | | |
| S17 | ∞ | 0.50 | 1.5168 | 64.20 |
| S18 | ∞ | 0.53 | | |
| S19 | ∞ | | | |

Table 6 shows aspherical coefficients in the zoom lens 100 of FIG. 4.

TABLE 6

| Lens surface | K | A | B | C | D |
|---|---|---|---|---|---|
| S6 | 19.50080 | −1.73827E−03 | 8.16525E−05 | −2.49837E−06 | 3.60277E−08 |
| S7 | 1.22160 | −2.17378E−03 | 1.01474E−04 | −3.87181E−06 | 6.07659E−08 |
| S10 | −0.62128 | −3.28639E−04 | −1.05080E−05 | 4.41536E−06 | 0.00000E+00 |
| S11 | −10.32713 | 1.05232E−04 | 1.67796E−05 | −5.97666E−07 | 6.53692E−07 |
| S15 | 1.65065 | 1.16771E−03 | −1.23913E−04 | 5.50787E−06 | −1.09753E−07 |
| S16 | −2.964988 | 0.001543685 | −0.00016708 | 6.70901E−06 | −1.1873E−07 |

Table 7 shows variable distances in the zoom lens 100 of FIG. 4 during zooming.

TABLE 7

| | Wide-angle position | Middle position | Telephoto position |
|---|---|---|---|
| D1 | 0.73 | 8.58 | 17.62 |
| D2 | 13.79 | 4.91 | 0.50 |
| D3 | 3.39 | 11.73 | 15.99 |
| D4 | 3.65 | 2.82 | 2.25 |

Table 8 shows various design data of the zoom lens 100 of FIG. 4 at a wide-angle position, a middle position, and a telephoto position.

TABLE 8

|  | Wide-angle position | Middle position | Telephoto position |
|---|---|---|---|
| F | 4.45 | 15.65 | 43.64 |
| FNo | 3.23 | 5.37 | 6.57 |
| OAL | 36.48 | 42.96 | 51.28 |
| 2w | 41.43 | 14.10 | 5.15 |
| BFL (in air) | 4.51 | 3.68 | 3.11 |

Figure 5:
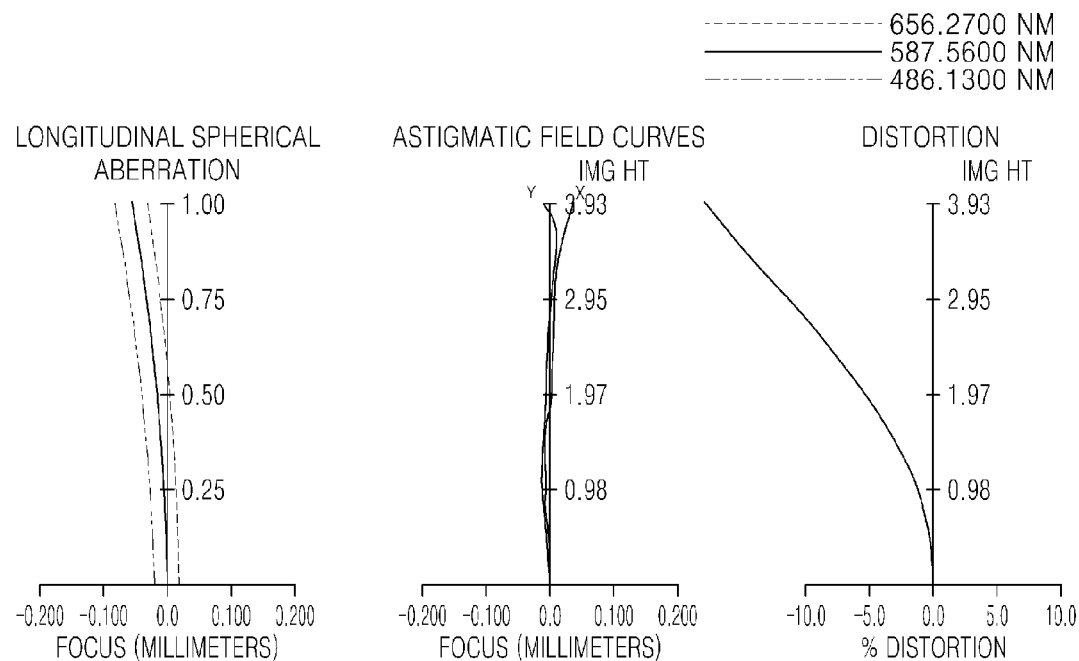
FIG. 5 is a diagram illustrating aberrations of the zoom lens of FIG. 4 at the wide-angle position.
Figure 6:
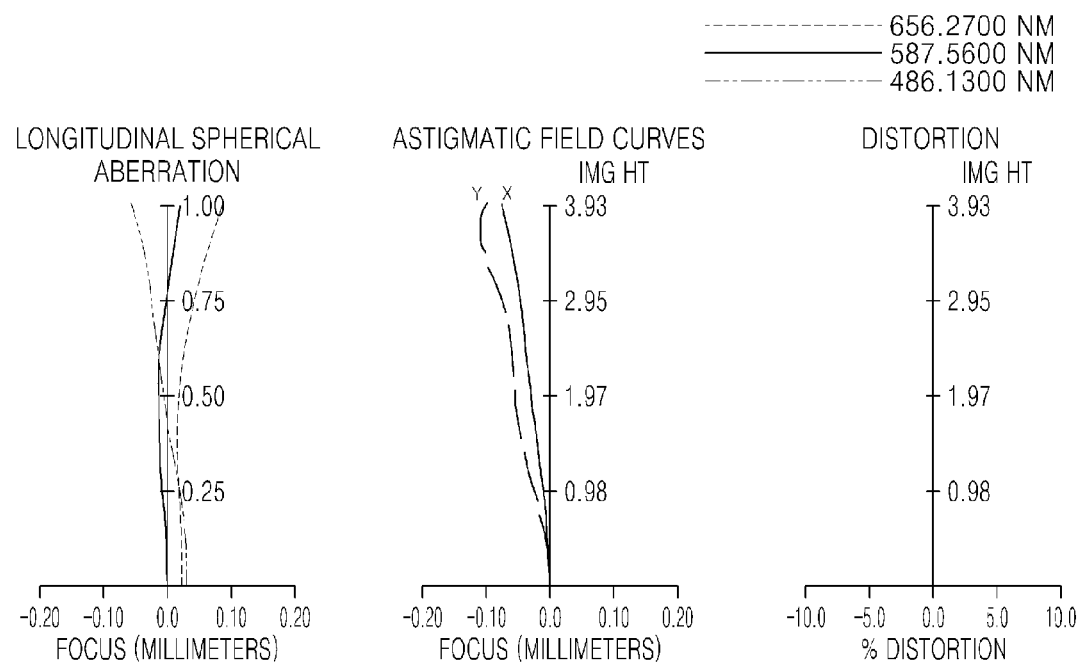
FIG. 6 is a diagram illustrating aberrations of the zoom lens of FIG. 4 at the telephoto position.

FIGS. 5 and 6 illustrate longitudinal spherical aberration, astigmatic field curves, and distortion of the zoom lens 100 of FIG. 4 at the wide-angle position and at the telephoto position, respectively.

Embodiment 3

Figure 7:
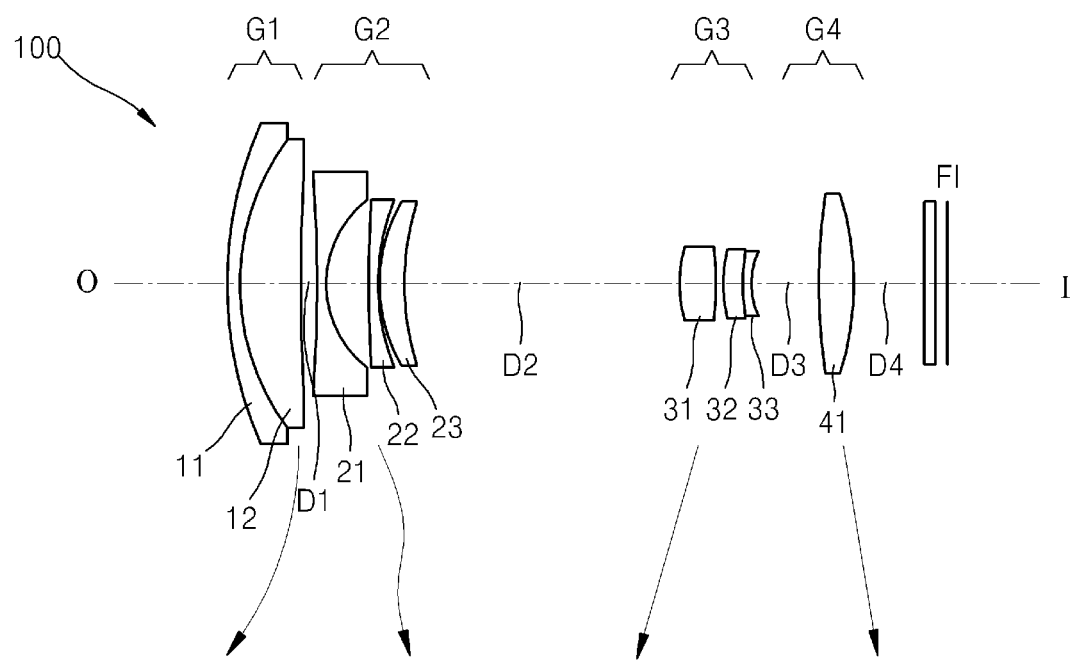
FIG. 7 is a diagram illustrating a zoom lens, according to another embodiment.

FIG. 7 illustrates a zoom lens 100 according to another embodiment, and Table 9 below shows design data of the zoom lens 100 of FIG. 7.

TABLE 9

| Lens surface | Radius of curvature (R) | Thickness (Dn) | Nd | Vd |
|---|---|---|---|---|
| S1 | 18.289 | 0.68 | 2.0010 | 29.13 |
| S2 | 12.012 | 3.33 | 1.6968 | 55.46 |
| S3 | 375.954 | D1 | | |
| S4 | −76.080 | 0.50 | 1.8061 | 40.73 |
| S5 | 5.392 | 1.88 | | |
| S6* | 19.818 | 0.70 | 1.5312 | 56.51 |
| S7* | 8.040 | 0.10 | | |
| S8 | 7.321 | 1.42 | 2.1042 | 17.02 |
| S9 | 10.820 | D2 | | |
| S10* | 4.838 | 1.98 | 1.5892 | 60.62 |
| S11* | −12.275 | 0.12 | | |
| S12 | 7.348 | 1.12 | 1.8061 | 33.27 |
| S13 | −147.730 | 0.36 | 1.8052 | 25.46 |
| S14 | 3.542 | D3 | | |
| S15* | 34.501 | 1.70 | 1.5312 | 56.51 |
| S16* | −13.948 | D4 | | |
| S17 | ∞ | 0.50 | 1.5168 | 64.20 |
| S18 | ∞ | 0.53 | | |
| S19 | ∞ | | | |

Table 10 shows aspherical coefficients in the zoom lens 100 of FIG. 7.

TABLE 10

| Lens surface | K | A | B | C | D |
|---|---|---|---|---|---|
| S6 | 16.59665 | −1.65337E−03 | 8.28415E−05 | −2.38282E−06 | 3.63792E−08 |
| S7 | 1.34197 | −2.13193E−03 | 1.04651E−04 | −4.07091E−06 | 6.34056E−08 |
| S10 | −0.71367 | −4.46683E−04 | 5.25959E−05 | −6.55779E−06 | 0.00000E+00 |
| S11 | −8.27349 | 5.75821E−05 | 8.99935E−05 | −1.56248E−05 | 5.71005E−07 |
| S15 | −2.51515 | 1.11192E−03 | −1.30108E−04 | 6.01649E−06 | −1.03440E−07 |
| S16 | −0.29582 | 1.56741E−03 | −1.75935E−04 | 7.48039E−06 | −1.19345E−07 |

Table 11 shows variable distances in the zoom lens 100 of FIG. 7 during zooming.

TABLE 11

|  | Wide-angle position | Middle position | Telephoto position |
|---|---|---|---|
| D1 | 0.74 | 8.85 | 18.28 |
| D2 | 14.10 | 5.37 | 0.51 |
| D3 | 3.53 | 12.01 | 16.30 |
| D4 | 3.79 | 2.96 | 2.32 |

Table 12 shows various design data of the zoom lens 100 of FIG. 7 at a wide-angle position, a middle position, and a telephoto position.

TABLE 12

|  | Wide-angle position | Middle position | Telephoto position |
|---|---|---|---|
| F | 4.45 | 15.78 | 47.85 |
| FNo | 3.29 | 5.42 | 6.67 |
| OAL | 37.08 | 44.11 | 52.32 |
| 2w | 41.44 | 13.98 | 4.69 |
| BFL(in air) | 4.65 | 3.81 | 3.18 |

FIGS. 8 and 9 illustrate longitudinal spherical aberration, astigmatic field curves, and distortion of the zoom lens 100 of FIG. 7 at the wide-angle position and at the telephoto position, respectively.

Embodiment 4

Figure 10:
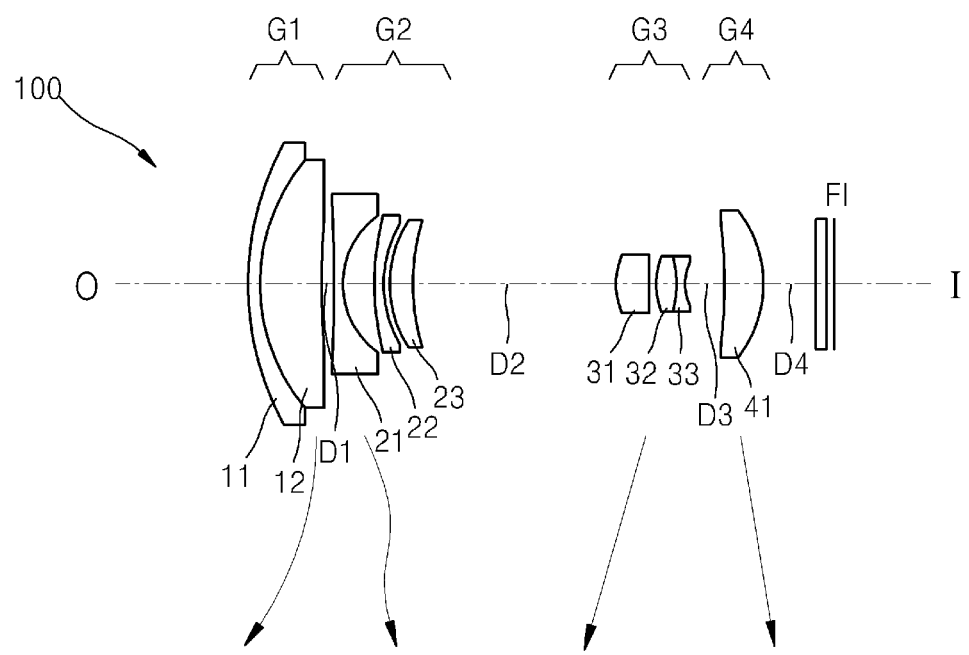
FIG. 10 is a diagram illustrating a zoom lens, according to another embodiment.

FIG. 10 illustrates a zoom lens 100 according to another embodiment, and Table 13 below shows design data of the zoom lens 100 of FIG. 10.

TABLE 13

| Lens surface | Radius of curvature (R) | Thickness(Dn) | Nd | Vd |
|---|---|---|---|---|
| S1 | 13.739 | 0.55 | 2.0010 | 29.13 |
| S2 | 9.132 | 3.03 | 1.6968 | 55.46 |
| S3 | 181.391 | D1 | | |
| S4 | −54.344 | 0.42 | 1.8061 | 40.73 |
| S5 | 3.970 | 1.45 | | |
| S6* | 8.457 | 0.55 | 1.5312 | 56.51 |
| S7* | 4.870 | 0.22 | | |
| S8 | 5.773 | 1.03 | 2.1021 | 16.77 |
| S9 | 8.325 | D2 | | |
| S10* | 3.793 | 1.70 | 1.5891 | 61.25 |
| S11* | −13.034 | 0.31 | | |
| S12 | 5.414 | 1.00 | 1.8061 | 33.27 |
| S13 | −6.551 | 0.35 | 1.8052 | 25.46 |
| S14 | 2.910 | D3 | | |
| S15* | −40.632 | 1.78 | 1.5312 | 56.51 |
| S16* | −5.998 | D4 | | |
| S17 | ∞ | 0.50 | 1.5168 | 64.20 |

TABLE 13-continued

| Lens surface | Radius of curvature (R) | Thickness(Dn) | Nd | Vd |
|---|---|---|---|---|
| S18 | ∞ | 0.41 | | |
| S19 | ∞ | | | |

Table 14 shows aspherical coefficients in the zoom lens 100 of FIG. 10.

TABLE 14

| Lens surface | K | A | B | C | D |
|---|---|---|---|---|---|
| S6 | 4.21652 | −6.46395E−03 | 3.38221E−04 | −7.00717E−06 | 4.60746E−08 |
| S7 | −2.31069 | −4.79531E−03 | 4.27816E−04 | −1.10635E−05 | 1.88350E−07 |
| S10 | −0.53401 | 1.07771E−03 | 2.42696E−04 | 7.04463E−05 | 0.00000E+00 |
| S11 | −25.17855 | 2.69722E−03 | 6.16071E−04 | 4.17768E−05 | 8.30321E−06 |
| S15 | 38.74433 | 1.32269E−03 | −3.31870E−04 | 2.69343E−05 | −1.65190E−06 |
| S16 | −0.10019 | 2.70694E−03 | −3.55227E−04 | 2.10731E−05 | −9.66365E−07 |

Table 15 shows variable distances in the zoom lens 100 of FIG. 10 during zooming.

TABLE 15

| | Wide-angle position | Middle position | Telephoto position |
|---|---|---|---|
| D1 | 0.61 | 5.75 | 12.57 |
| D2 | 9.82 | 3.75 | 0.50 |
| D3 | 1.96 | 6.88 | 11.59 |
| D4 | 2.53 | 2.47 | 2.10 |

Table 16 shows various design data of the zoom lens 100 of FIG. 10 at a wide-angle position, a middle position, and a telephoto position.

TABLE 16

| | Wide-angle position | Middle position | Telephoto position |
|---|---|---|---|
| F | 3.40 | 10.48 | 31.90 |
| FNo | 3.14 | 4.93 | 6.67 |
| OAL | 28.23 | 32.17 | 40.05 |
| 2w | 42.09 | 16.35 | 5.51 |
| BFL(in air) | 3.26 | 3.22 | 2.87 |

FIGS. 11 and 12 illustrate longitudinal spherical aberration, astigmatic field curves, and distortion of the zoom lens 100 of FIG. 10 at the wide-angle position and at the telephoto position, respectively.

Embodiment 5

Figure 13:
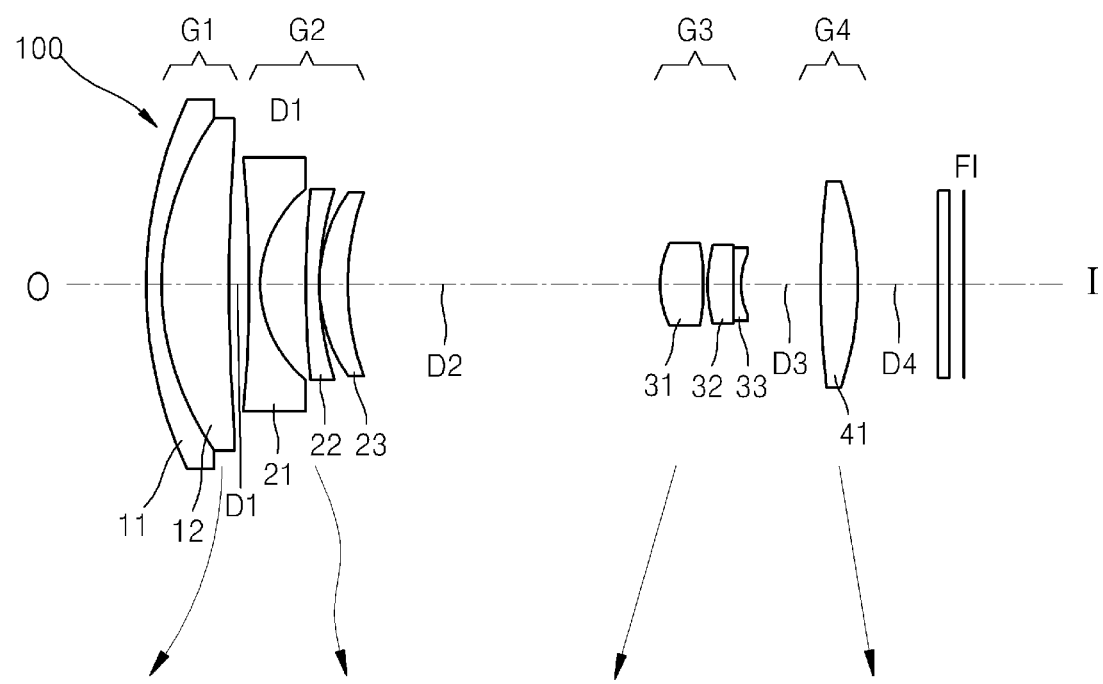
FIG. 13 is a diagram illustrating a zoom lens, according to another embodiment.

FIG. 13 illustrates a zoom lens 100 according to another embodiment, and Table 17 below shows design data of the zoom lens 100 of FIG. 13.

TABLE 17

| Lens surface | Radius of curvature(R) | Thickness(Dn) | Nd | Vd |
|---|---|---|---|---|
| 1 | 18.292 | 0.68 | 2.0010 | 29.13 |
| 2 | 12.161 | 3.20 | 1.6968 | 55.46 |
| 3 | 252.159 | D1 | | |
| 4 | −86.956 | 0.50 | 1.8061 | 40.73 |
| 5 | 5.429 | 2.00 | | |
| 6* | 23.553 | 0.66 | 1.5312 | 56.51 |
| 7* | 8.671 | 0.10 | | |
| 8 | 8.243 | 1.23 | 2.1021 | 16.77 |
| 9 | 13.234 | D2 | | |
| 10* | 5.072 | 1.92 | 1.5892 | 60.62 |
| 11* | −13.443 | 0.12 | | |
| 12 | 6.427 | 1.20 | 1.8061 | 33.27 |
| 13 | −17.825 | 0.36 | 1.8052 | 25.46 |
| 14 | 3.411 | D3 | | |
| 15* | 32.961 | 1.72 | 1.5312 | 56.51 |
| 16* | −13.652 | D4 | | |
| 17 | ∞ | 0.50 | 1.5168 | 64.20 |
| 18 | ∞ | 0.53 | | |
| S19 | ∞ | | | |

Table 18 shows aspherical coefficients in the zoom lens 100 of FIG. 13.

TABLE 18

| Lens surface | K | A | B | C | D |
|---|---|---|---|---|---|
| S6 | 23.16597 | −1.79845E−03 | 8.88597E−05 | −2.84253E−06 | 3.91030E−08 |
| S7 | 0.93655 | −2.20077E−03 | 1.12369E−04 | −4.34248E−06 | 6.98431E−08 |
| S10 | −0.68085 | −3.88143E−04 | −1.66182E−05 | 3.00298E−06 | 0.00000E+00 |
| S11 | −9.14387 | −8.20471E−06 | 1.84169E−05 | −8.33389E−06 | 1.54209E−06 |
| S15 | 9.43049 | 1.10650E−03 | −1.15778E−04 | 5.13457E−06 | −1.05355E−07 |
| S16 | 0.36135 | 1.66490E−03 | −1.55401E−04 | 6.10836E−06 | −1.09916E−07 |

Table 19 shows variable distances in the zoom lens 100 of FIG. 13 during zooming.

TABLE 19

| | Wide-angle position | Middle position | Telephoto position |
|---|---|---|---|
| D1 | 0.74 | 8.77 | 17.62 |
| D2 | 13.63 | 4.71 | 0.50 |
| D3 | 3.35 | 11.43 | 15.60 |
| D4 | 3.64 | 2.96 | 2.31 |

Table 20 shows various design data of the zoom lens 100 of FIG. 13 at a wide-angle position, a middle position, and a telephoto position.

TABLE 20

| | Wide-angle position | Middle position | Telephoto position |
|---|---|---|---|
| F | 4.46 | 15.59 | 41.81 |
| FNo | 3.21 | 5.29 | 6.44 |
| OAL | 36.10 | 42.59 | 50.77 |
| 2w | 41.53 | 14.22 | 5.40 |
| BFL(in air) | 4.50 | 3.82 | 3.23 |

Figure 14:
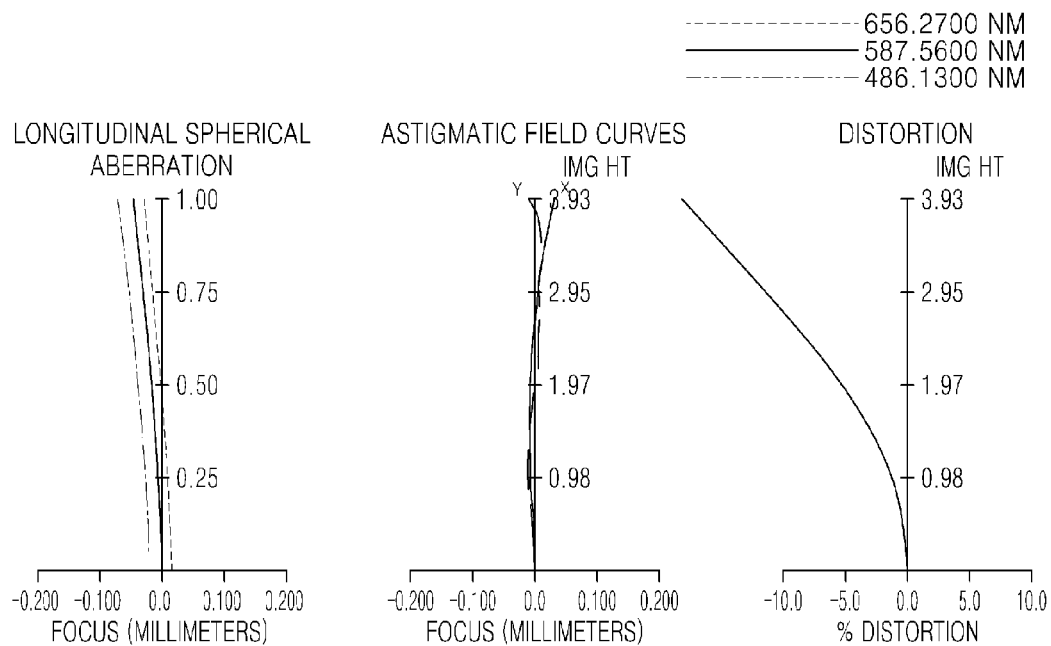
FIG. 14 is a diagram illustrating aberrations of the zoom lens of FIG. 13 at the wide-angle position.
Figure 15:
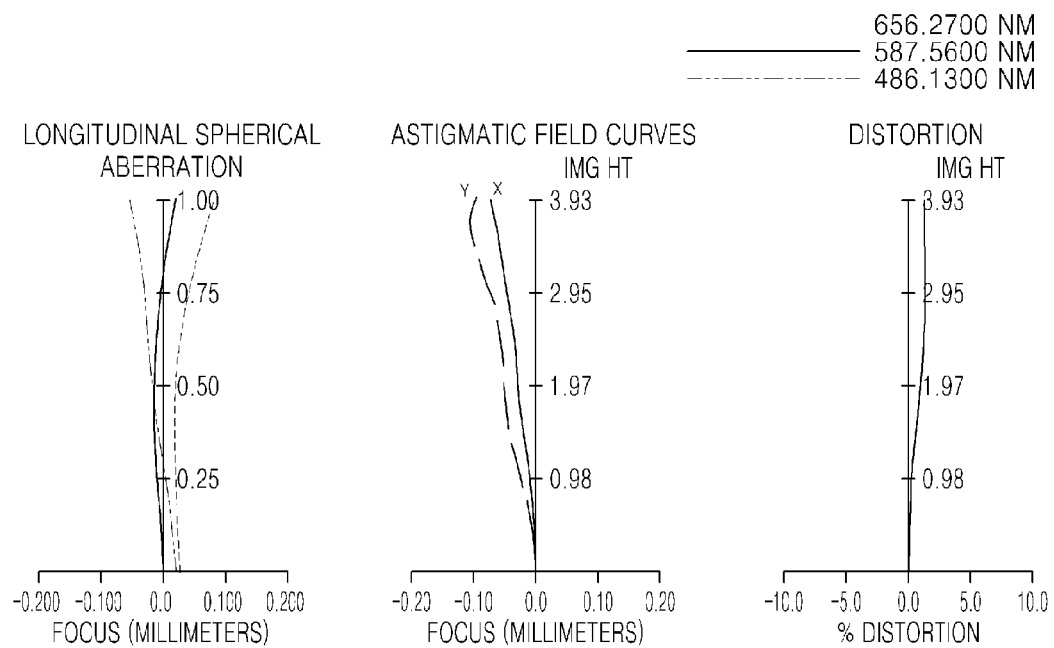
FIG. 15 is a diagram illustrating aberrations of the zoom lens of FIG. 13 at the telephoto position.

FIGS. 14 and 15 illustrate longitudinal spherical aberration, astigmatic field curves, and distortion of the zoom lens 100 of FIG. 13 at the wide-angle position and at the telephoto position, respectively.

Embodiment 6

Figure 16:
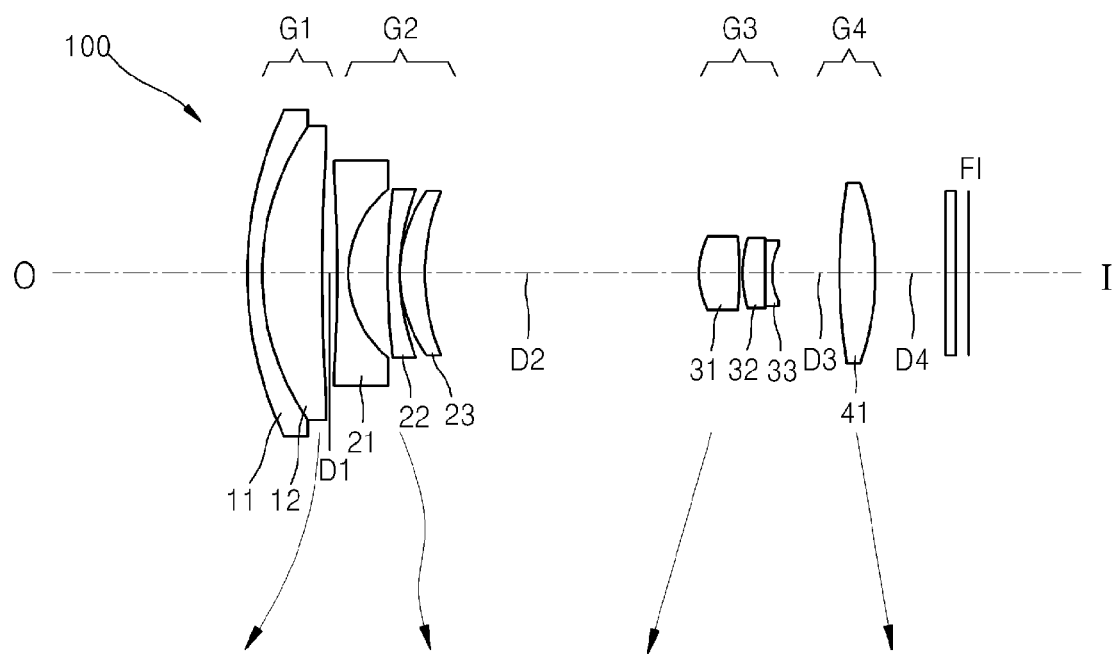
FIG. 16 is a diagram illustrating a zoom lens, according to another embodiment.

FIG. 16 illustrates a zoom lens 100 according to another embodiment, and Table 21 below shows design data of the zoom lens 100 of FIG. 16.

TABLE 21

| Lens surface | Radius of curvature(R) | Thickness(Dn) | Nd | Vd |
|---|---|---|---|---|
| S1 | 17.860 | 0.68 | 2.0010 | 29.13 |
| S2 | 11.841 | 3.45 | 1.6968 | 55.46 |
| S3 | 219.990 | D1 | | |
| S4 | −80.836 | 0.50 | 1.8061 | 40.73 |
| S5 | 5.495 | 1.90 | | |
| S6* | 19.801 | 0.70 | 1.5312 | 56.51 |
| S7* | 8.037 | 0.10 | | |
| S8 | 7.394 | 1.51 | 2.1042 | 17.02 |
| S9 | 10.862 | D2 | | |
| S10* | 4.755 | 1.37 | 1.5892 | 60.62 |
| S11* | −13.623 | 0.37 | | |
| S12 | 7.080 | 1.10 | 1.8061 | 33.27 |
| S13 | 49.174 | 0.36 | 1.8052 | 25.46 |
| S14 | 3.418 | D3 | | |
| S15* | 32.056 | 1.75 | 1.5312 | 56.51 |
| S16* | −12.953 | D4 | | |
| S17 | ∞ | 0.50 | 1.5168 | 64.20 |
| S18 | ∞ | 0.53 | | |
| S19 | ∞ | | | |

Table 22 shows aspherical coefficients in the zoom lens 100 of FIG. 16.

TABLE 22

| Lens surface | K | A | B | C | D |
|---|---|---|---|---|---|
| S6 | 16.12263 | −1.64214E−03 | 9.23698E−05 | −2.64513E−06 | 2.99956E−08 |
| S7 | 1.45248 | −2.14868E−03 | 1.15364E−04 | −4.62524E−06 | 6.04166E−08 |
| S10 | −0.69228 | −4.34105E−04 | 1.81358E−05 | −3.53997E−06 | 0.00000E+00 |
| S11 | −8.45476 | 8.77873E−05 | 4.68967E−05 | −1.21999E−05 | 6.41493E−07 |
| S15 | −1.23900 | 1.07022E−03 | −1.32833E−04 | 6.74478E−06 | −1.29292E−07 |
| S16 | −0.53066 | 1.54529E−03 | −1.75592E−04 | 8.08269E−06 | −1.43376E−07 |

Table 23 shows variable distances in the zoom lens 100 of FIG. 16 during zooming.

TABLE 23

| | Wide-angle position | Middle position | Telephoto position |
|---|---|---|---|
| D1 | 0.78 | 8.98 | 18.59 |
| D2 | 14.31 | 5.74 | 0.50 |
| D3 | 3.24 | 11.52 | 16.30 |
| D4 | 3.97 | 3.26 | 2.31 |

Table 24 shows various design data of the zoom lens 100 of FIG. 16 at a wide-angle position, a middle position, and a telephoto position.

TABLE 24

| | Wide-angle position | Middle position | Telephoto position |
|---|---|---|---|
| F | 4.45 | 15.40 | 49.55 |
| FNo | 3.22 | 5.27 | 6.58 |
| OAL | 37.13 | 44.32 | 52.53 |
| 2w | 41.44 | 14.32 | 4.54 |
| BFL(in air) | 4.83 | 4.11 | 3.17 |

Figure 17:
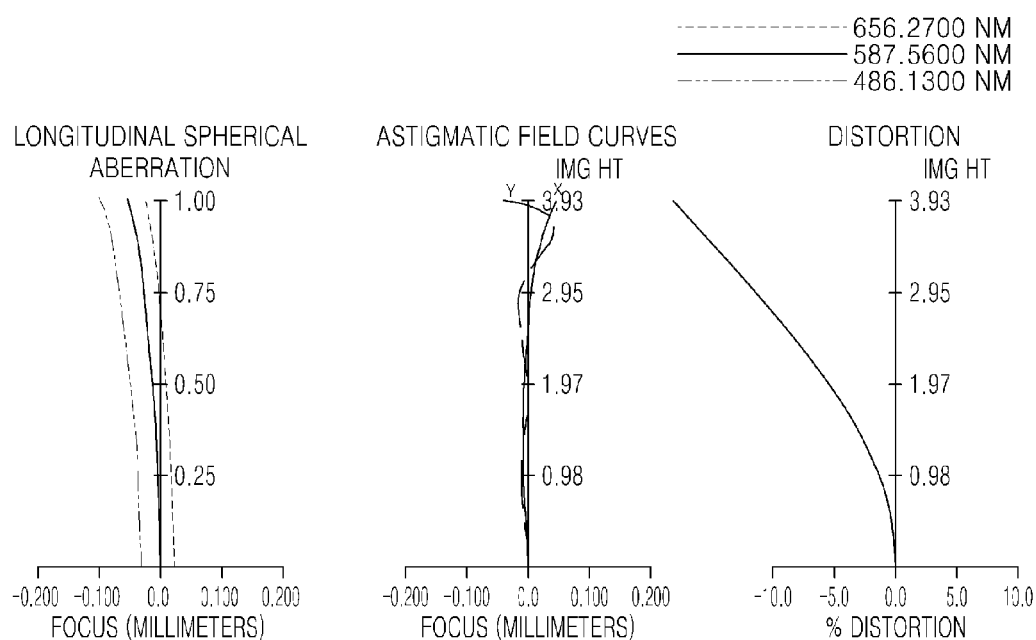
FIG. 17 is a diagram illustrating aberrations of the zoom lens of FIG. 16 at the wide-angle position.
Figure 18:
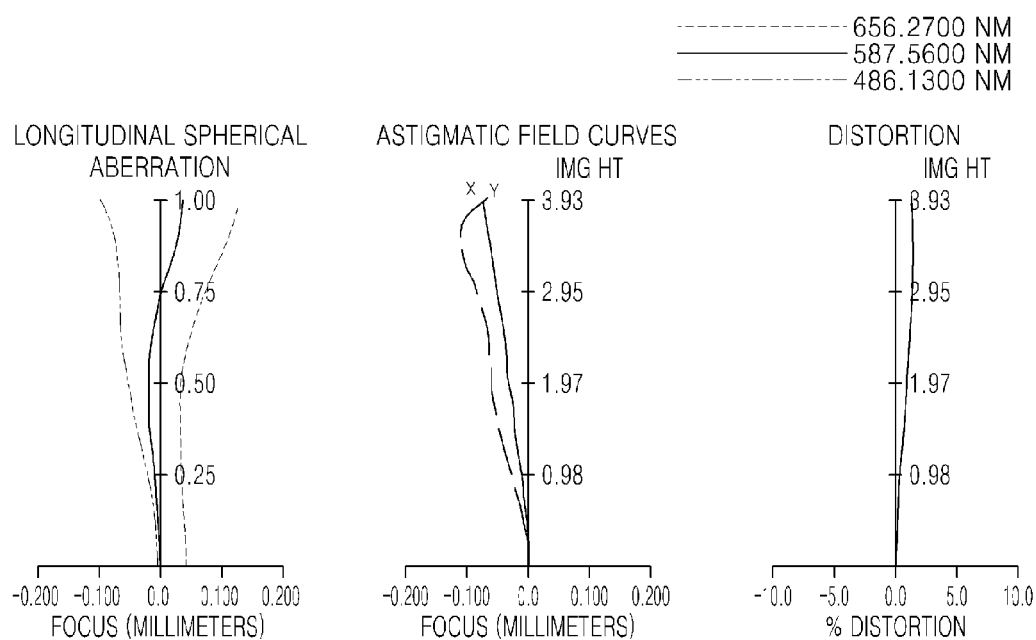
FIG. 18 is a diagram illustrating aberrations of the zoom lens of FIG. 16 at the telephoto position.

FIGS. 17 and 18 illustrate longitudinal spherical aberration, astigmatic field curves, and distortion of the zoom lens 100 of FIG. 16 at the wide-angle position and at the telephoto position, respectively.

As evident from Table 25, the zoom lenses 100 according to Embodiment 1 through Embodiment 6 satisfy Inequalities (1) through (3).

TABLE 25

| Inequalities | Embodiment 1 | Embodiment 2 | Embodiment 3 | Embodiment 4 | Embodiment 5 | Embodiment 6 |
|---|---|---|---|---|---|---|
| (1) $\|fG2_{n2}/fw\|$ | 5.70 | 5.82 | 5.84 | 6.88 | 5.86 | 5.83 |
| (2) $\|fG2_{n2}\|/\sqrt{(fw * ft)}$ | 1.86 | 1.86 | 1.78 | 2.25 | 1.91 | 1.75 |
| (3) $\|fG2n/fG2\|$ | 0.67 | 0.68 | 0.69 | 0.70 | 0.67 | 0.70 |

Figure 19:
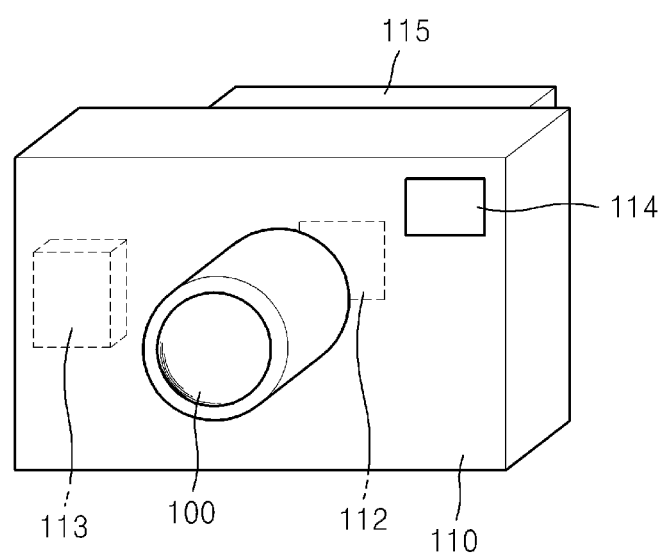
FIG. 19 is a diagram illustrating a photographing apparatus, according to an embodiment.

FIG. 19 illustrates a photographing apparatus 110 including the zoom lens 100 according to an embodiment. The photographing apparatus 110 according to the embodiment includes the zoom lens 100 described above with respect to the embodiments and an imaging device 112 that receives an image formed by the zoom lens 100. The photographing apparatus 110 may further include a recording device 113 on which information corresponding to an image of a subject, which is photoelectrically converted by the imaging device 112, is recorded, a viewfinder 114 for observing the image of the subject, and a display unit 115 that displays the image of the subject. While the viewfinder 114 and the display unit 115 are separately arranged, the photographing apparatus 110 according to the embodiment may only include the display unit 115. The photographing apparatus 110 of FIG. 19 is only an exemplary embodiment of the invention, and thus the invention may be applied to various optical equipment other than the photographing apparatus 110 of FIG. 19. As described above, by using the zoom lens 100 according to the embodiments in a photographing apparatus such as a digital camera, compact optical equipment having high brightness and high magnification may be provided.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A zoom lens comprising:
   a first lens group having a positive refractive power, a second lens group having a negative refractive power, a third lens group having a positive refractive power, and a fourth lens group having a positive refractive power, all of which are arranged sequentially from an object side to an image side,
   wherein the second lens group comprises a first negative lens, a second negative lens, and a first positive lens, and satisfies $5.6 \leq |fG2_{n2}/fw| \leq 10.0$, where $fG2_{n2}$ is a focal length of the second negative lens in the second lens group, and fw is an overall focal length of the zoom lens at a wide-angle position,
   wherein the third lens group comprises a third positive lens and a fourth positive lens, each of the third and fourth positive lenses having a double-convex shape, and a fourth negative lens, and
   wherein the zoom lens further satisfies $0.65 < |fG2n/fG2| < 0.85$, where fG2n is an effective focal length of the first and second negative lenses in the second lens group, and fG2 is an overall focal length of the second lens group.

2. The zoom lens of claim 1, wherein the second negative lens in the second lens group is made of plastic.

3. The zoom lens of claim 2, wherein the zoom lens further satisfies $1.5 \leq |fG2\_n2|/\sqrt{(fw*ft)} \leq 3.0$, where ft is an overall focal length of the zoom lens at a telephoto position.

4. The zoom lens of claim 1, wherein upon zooming from the wide-angle position to the telephoto position, distances between the first and second lens groups and between the third and fourth lens groups increase while a distance between the second and third lens groups decreases.

5. The zoom lens of claim 1, wherein the first lens group comprises a third negative lens and a second positive lens.

6. The zoom lens of claim 5, wherein the third negative lens in the first lens group has a meniscus shape that is convex toward the object side.

7. The zoom lens of claim 5, wherein the third negative lens and the second positive lens in the first lens group are cemented together to form a doublet lens.

8. The zoom lens of claim 1, wherein at least one of the third and fourth positive lenses has at least one aspherical surface.

9. The zoom lens of claim 1, wherein the fourth lens group comprises one fifth positive lens.

10. The zoom lens of claim 9, wherein the fifth positive lens is made of plastic.

11. The zoom lens of claim 1, wherein the fourth lens group performs focusing.

12. The zoom lens of claim 1, wherein the second negative lens in the second lens group has a meniscus shape that is convex toward the object side.

13. A zoom lens comprising:
    a first lens group having a positive refractive power, a second lens group having a negative refractive power, a third lens group having a positive refractive power, and a fourth lens group having a positive refractive power, all of which are arranged sequentially from an object side to an image side,
    wherein the second lens group comprises a first negative lens, a second negative lens, and a first positive lens, and satisfies $5.6 \leq |fG2_{n2}/fw| \leq 10.0$, where $fG2_{n2}$ is a focal length of the second negative lens in the second lens group, and fw is an overall focal length of the zoom lens at a wide-angle position,
    wherein the third lens group comprises a third positive lens and a fourth positive lens, each of the third and fourth positive lenses having a double-convex shape, and a fourth negative lens, and
    wherein the fourth positive lens and the fourth negative lens are cemented together to form a doublet lens.

14. A photographing apparatus comprising:
    a zoom lens comprising:
      a first lens group having a positive refractive power, a second lens group having a negative refractive power, a third lens group having a positive refractive power, and a fourth lens group having a positive refractive power, all of which are arranged sequentially from an object side to an image side,
      wherein the second lens group comprises a first negative lens, a second negative lens, and a first positive lens, and satisfies $5.6 \leq |fG2_{n2}/fw| \leq 10.0$, where $fG2_{n2}$ is a focal length of the second negative lens in the second lens group and fw is an overall focal length of the zoom lens at a wide-angle position,
      wherein the third lens group comprises a third positive lens and a fourth positive lens, each of the third and fourth positive lenses having a double-convex shape, and a fourth negative lens, and
      wherein the zoom lens further satisfies $0.65 < |fG2n/fG2| < 0.85$, where fG2n is an effective focal length of the first and second negative lenses in the second lens group, and fG2 is an overall focal length of the second lens group; and
    an imaging device for receiving an image formed by the zoom lens.

* * * * *